(12) United States Patent
Edens et al.

(10) Patent No.: US 7,533,337 B2
(45) Date of Patent: May 12, 2009

(54) METHOD, SYSTEM AND COMPUTER PROGRAM FOR GENERATING MESSAGES

(75) Inventors: Bertus Karel Edens, Drachten (NL); René Scheltes, Drachten (NL); Jelle Wiersma, Drachtster-Compagnie (NL)

(73) Assignee: Neopost Industrie B.V., Drachten (NL)

( * ) Notice: Subject to any disclaimer, the term of this patent is extended or adjusted under 35 U.S.C. 154(b) by 173 days.

(21) Appl. No.: 10/321,498

(22) Filed: Dec. 18, 2002

(65) Prior Publication Data
US 2003/0140032 A1 Jul. 24, 2003

(30) Foreign Application Priority Data
Dec. 18, 2001 (NL) .................................... 1019594

(51) Int. Cl.
*G06F 17/00* (2006.01)
(52) U.S. Cl. .................. 715/255; 715/200; 358/1.15
(58) Field of Classification Search ................. 715/513, 715/501.1, 500, 234, 200, 255, 209, 206, 715/207; 709/206–207; 358/1.15, 296, 401
See application file for complete search history.

(56) References Cited

U.S. PATENT DOCUMENTS

| | | | | |
|---|---|---|---|---|
| 3,986,662 | A * | 10/1976 | Luftig | 229/71 |
| 5,704,543 | A * | 1/1998 | Pollanen | 229/303 |
| 5,923,848 | A * | 7/1999 | Goodhand et al. | 709/219 |
| 5,933,811 | A * | 8/1999 | Angles et al. | 705/14 |
| 6,167,523 | A * | 12/2000 | Strong | 713/201 |
| 6,249,716 | B1 * | 6/2001 | Edens et al. | 700/222 |
| 6,338,076 | B1 * | 1/2002 | Hidding et al. | 715/203 |
| 6,438,584 | B1 * | 8/2002 | Powers | 709/206 |
| 6,622,295 | B1 * | 9/2003 | Schepp et al. | 716/19 |
| 2001/0016870 | A1 * | 8/2001 | Van Der Meer | 709/203 |
| 2002/0087382 | A1 * | 7/2002 | Tiburcio | 705/9 |
| 2003/0046315 | A1 * | 3/2003 | Feig | 707/512 |

FOREIGN PATENT DOCUMENTS

| | | |
|---|---|---|
| EP | 1 016 468 | 7/2000 |
| EP | 1 113 370 | 7/2001 |

OTHER PUBLICATIONS

European Patent Office—Form PCT/ISA 201a dated Aug. 28, 2002.
Technical Conference—Jan. 16-20, 1995 / SIFT—A Tool for Wide-Area Information Dissemination (Tak W. Yan).

(Continued)

*Primary Examiner*—Thu Huynh
(74) *Attorney, Agent, or Firm*—Buchanan Ingersoll & Rooney PC

(57) ABSTRACT

For composing messages of a particular type, layout instructions identical for each document are provided. In accordance with selection instructions, in each case, for a prescribed position in the documents, data are selected and read from a data source. In accordance with layout instructions, the read data are processed into documents. In accordance with the handling instructions, the read data are processed into message data (19, 20, 21, 22, 23) other than the document data. The finishing of the documents into messages is done in accordance with the message data. A system and a computer program for practicing the proposed method is also described.

8 Claims, 2 Drawing Sheets

OTHER PUBLICATIONS

11453 First Intern. Conference on Artificial Intelligence / A Wide Area Network Information Filter (M. F. Wyle).
Accelio Present—Product Solutions (Oct. 19, 2001).
Accelio Present—Web Output Pak (2001).
Accelio Present—Central Pro—Business Information Transformed into Effective Customer-Facing Documents.
Accelio Present—Central Pro (Oct. 19, 2001).
Accelio Capture—Product Solutions (Oct. 19, 2001).
XML Forms Architecture (XFA) (Oct. 26, 2001).
XFA—Template (Oct. 19, 2001).
XA FormCalc Specification (Oct. 26, 2001).
XFA-Template (Oct. 26, 2001).
Enhance the Value of Your Statements, 2000.

* cited by examiner

METHOD, SYSTEM AND COMPUTER PROGRAM FOR GENERATING MESSAGES

This patent application is based on the Dutch patent application 1019594, the content of which is hereby inserted by reference.

FIELD AND BACKGROUND OF THE INVENTION

The invention relates to a method, a system and to computer software for generating messages.

Such a method, such a system and such computer software are known from practice in the form of the ISIS Papyrus system and the application thereof. This system provides for possibilities, starting from data from a source in the form of, for instance, Xerox DJDE or line data, ASCII strings, SAP R/3 OTF or net data, of generating documents in which the respective data-representing signs are incorporated according to a pattern and layout identical for each document. This does not mean, though, that the portions of the documents which do not constitute representations of the selected read data need to be exactly the same for all documents. Thus, for instance, The length (possibly also the number of pages) of the representation of the fill-in data and hence the distance between starting and end portions identical for all documents may be different, or the positions where text has been broken off at the ends of lines may differ depending on the lengths of the inserted representations of fill-in data.

Such systems for composing documents especially find application where large numbers of documents are generated and are sent to large numbers of addressees. Accordingly, facilities have been provided to be able to finish the documents and to prepare transmission, such as including additional OMR codes in the documents and automatically printing documents in the order of the postal code. These facilities, however, permit only a limited variety of processing possibilities.

SUMMARY OF THE INVENTION

It is an object of the invention, in automatically generating messages whereby the documents are generated starting from read data selected from a data source, and are processed according to layout instructions identical for all documents of a particular type, to considerably increase the versatility of the processing possibilities in a fast, simple manner.

This object is achieved, according to a first aspect of the invention, by a method for composing messages each comprising a document of a particular type, with the following operations:

providing layout instructions identical for each of the documents, providing selection instructions for selecting data from a data source, in each case for at least one prescribed position in the documents;

providing a data source with machine-readable data;

automatically composing the document-defining document data, comprising: selecting and reading data from the data source for at least one prescribed position in each of the documents in accordance with the selection instructions, and processing the read data in accordance with layout instructions into documents;

providing handling instructions;

processing the read data in accordance with the handling instructions into message data other than the document data; and finishing the documents in accordance with the message data into messages.

The invention further provides a system for composing messages, including:

a data processor assembly;

a memory structure containing:

selection instructions for selecting and reading, for each of the documents, data for placement at a predetermined position in each of the documents; and layout instructions for processing data selected for each of the documents, and associated, prescribed position data, into document data; and send-out means for sending out the composed, document data-containing documents.

The instructions stored in the memory structure further contain: handling instructions for handling the read data, including the processing of the read data into message data other than the document data.

Also forming part of the system are finishing means for finishing the documents in accordance with the message data into messages.

The invention may further be embodied in computer software in a form readable and processable by a data processor assembly, for composing messages, comprising:

selection instructions for selecting and reading, for each of the documents, data for placement at a predetermined position in each of the documents; and layout instructions for processing data selected for each of the documents and associated, prescribed position data into document data;

instructions for sending out the composed document data;

handling instructions for handling the read data, comprising the processing of the read data into message data other than the document data, and instructions for sending out the message data for finishing the documents into messages.

Particularly advantageous elaborations of the invention are set forth in the depending claims. Hereinafter the invention is further illustrated and elucidated on the basis of an exemplary embodiment with reference to the drawing.

DETAILED DESCRIPTION

Figure 1:
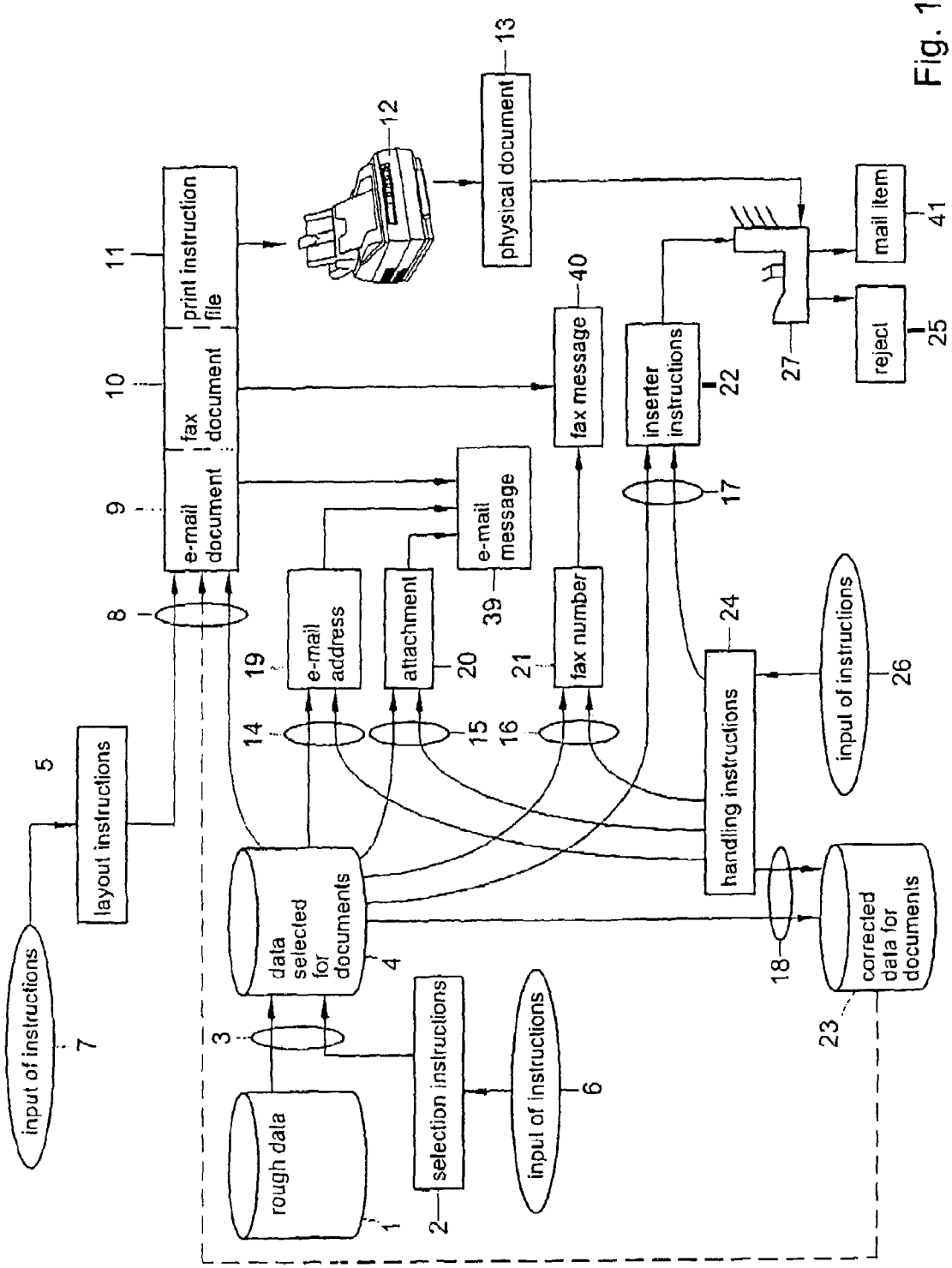
FIG. 1 is a schematic overview of starting data, processing possibilities, possible intermediate results and possible end results.

A number of examples of application possibilities of the proposed method as well as of the proposed system and of the proposed computer program are first elucidated with reference to FIG. 1.

The starting point is rough data 1 containing data on the basis of which a series of messages are to be sent to a number of addressees. The automatically readable rough data 1 can, for instance, have the form of an ASCII string which is obtained if an existing automated management system is given instruction to output data from a database, structured in a particular manner. The data can also be formed by a print stream for driving, for instance, a line printer for printing documents formatted to a limited extent on fanfold forms. Such documents were and are sometimes printed on preprinted forms and then, for instance, sent as an overview, bank statement or invoice. A further possibility is that the rough data are formed by a database, from which the data can be read. In that case, too, the need arises for the data selected according to particular rules to be given a form in an automatic manner, without being limited by the user interface which the respective application provides.

To extract from the rough data the data to be represented in the documents, the selection instructions 2 are provided These indicate in each case which data are selected from the rough data 1 for placement at a particular position in a document and proceed to assign to these data positioning data indicating, or at least referring to, the prospective position in the document. The selection instructions 2 are composed taking into account the structure of the data source 1 and the desired content and arrangement of the documents to be generated. To simplify the input 6 of the selection instructions 2, it is preferred to provide computer software in the form of a user interface which, at least for current types of rough data 1 and current document data formats, furnishes the user with tools for drafting the selection instructions 2. The oval 3 represents the process of selecting and reading the data from the data source 1 in accordance with the selection instructions 2. This process 3 results in a new database 4 containing the data selected for the positions in the documents to be generated, coupled to positioning data referring to the prospective positions of those data in the documents.

The thus selected and ordered data 4 are processed in accordance with layout instructions 5 in a processing operation 8, into documents 9, 10 and/or 11. The print file 11 in this context is regarded as an electronic form of the document 13 brought into a physical form by printing with printer 12.

For preparing the layout instructions too, it is preferred to provide a user interface, which supports the preparation of the layout instructions. This user interface can work, for instance, in a manner corresponding to a desktop publishing program, a word processing program or a markup language (for instance html or xml) editor. Preferably, the program also contains a document example (preview) function which makes it possible to represent on a screen examples of documents to be generated, using selected, read data 4. The layout instructions 5, for that matter, may also vary from one document to the next, depending on the data associated with a document, for instance for the purpose of randomly generating different kinds of documents, such as documents of different business units or documents intended for different target groups. Further, it is possible that the layout instructions 5 for documents of a particular kind have a portion which is the same for each document and a portion differing between documents, for instance different headings, but an otherwise identical layout.

The documents can contain, for instance, document data in a pdf, html or xml format. The e-mail document can then be brought into a visually perceptible form using a suitable application, such as an e-mail client or a web browser, and a display.

The document data of a document can also form a fax file or a file 10 to be converted into a fax signal with a suitable computer-fax program, which can be output as a fax signal with a fax-modem and which the receiving fax can convert into the printing of a document. Other examples of documents are files designed to be sent via WAP, voice mail or SMS.

It is possible, for that matter, to have the selection instructions 2 and the layout instructions 5 apply for a series of documents 9-11 to be generated, or to store them as a standard document generator for generating documents of a particular type and to call same each time when a single document of a particular type is to be generated, for instance by requesting an overview of a particular type for a particular customer. For generating a document or series of documents 9-11, in accordance with the selection instructions 2, data are selected and read from the data source 1 and coupled to one or more prescribed positions on each document (operation 3), and the document or the documents are laid out in accordance with the layout instructions established therefor (operation 8).

Additional use is made of the availability of the data 4 selected for placement at a particular prescribed position and read from the data source 1, by utilizing these data, at least in part, as input data for a further processing operation 14, 15, 16, 17 and/or 18, which further processing operation 14-18 results in message data 19-23 other than the document data which form the documents 9-11 and define the document content and the document design presenting itself to the addressee.

The operations 14-18 are carried out in accordance with handling instructions 24. For inputting the handling instructions (operation 26), there is preferably provided a user interface application which simplifies the coupling of data positions in the documents to message data.

As the selected and read data 4 are also processed, depending on the data, for generating message data 19-23 other than the document data, which message data 19-23 manage the composition of messages starting from the documents 9-11 and the data 4, a great versatility in the processing possibilities of the selected, read data 4 is obtained. As use is here made of data 4 which have been selected and read anyway, access to the data for managing the composition of messages is enabled in a simple, very fast and reliable manner.

Figure 3:
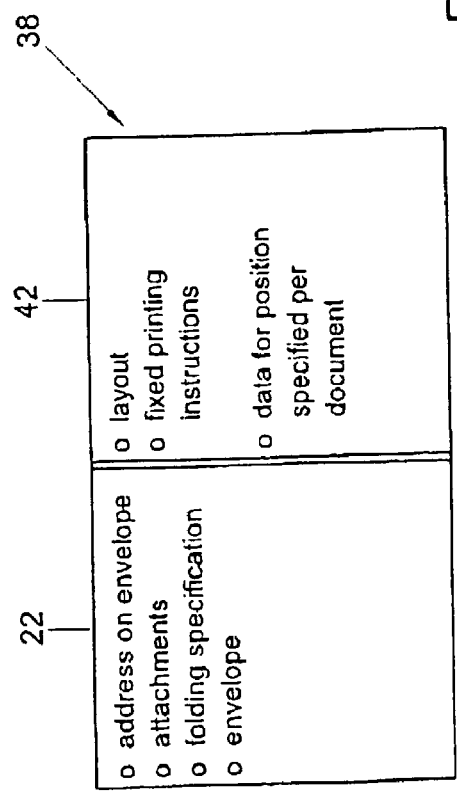
FIG. 3 is a schematic representation of message data defining a message.

FIG. 3 schematically represents the arrangement of the message data on the basis of message data 38 for a message to be sent by mail.

The message data 38 are composed of document data 42 on the basis of which the physical document 13 can be produced by actuating the printer 12, which document data 42 constitute the result of the rough data 1, the selection instructions 2 and the layout instructions 5, which may be understood to include the printing instructions identical for each document of a particular type, and the other message data 22 other than the document data. The document data and the other data, for that matter, do not in actual fact need to be clustered as in this example. What kind of data is involved may each time appear, for instance, from tags mentioned with the data.

The processing instructions that can be generated can have different forms. Thus, the processing instructions 24 can include, for instance, instructions for validating the selected, read data 4. The selected and read data 4 are then preferably processed in each case depending on the test result. In case of a conflict between the read data 4 selected for a position, for instance corrected data for that position 23 can be generated and in response to corrected data, based on those corrected data 23, documents 9, 10 or 11 can be generated once again. Here, the dispatch of the original document 9, 10 or 11 may or may not be suppressed. In response to, for instance, an error in an address, sometimes the document can still be sent if the corrected address is printed on the envelope.

Further, the handling instructions may provide, for instance, that in response to a conflict between a validation criterion and data intended for an e-mail, as address for that e-mail, an address 19 where error-containing documents are collected is specified as destination for the message containing the document. The document is thus not sent to the originally intended addressee. It is also possible to prevent a fax message or a physical document from being sent; this last being possible, for instance, in that according to the handling instructions 24, in response to a conflict signal, a signal for outputting the respective document to a reject-destination 25 is included in the inserter instructions 22. Another possibility (not shown) is for the handling instructions 24 to provide that in response to a conflict signal the printing of a document in accordance with the respective document data is suppressed.

The validation can take different forms. Thus, for instance, it can be validated whether the data at a particular position are of a particular type (for instance numerals or letters) or whether they requisitely correspond to data in a verification file.

Further, it can be checked whether particular data intended for placement at a position match data intended for placement at a different position Thus, it can for instance be checked whether the number that is to be represented as the sum of numbers to be represented at a number of positions is in fact the sum of the numbers to be represented at the respective positions.

Another example is the validation whether an authorization code on an order confirmation corresponds with the size of the respective order. The handling instructions can include, for instance, instructions for automatically replacing the order confirmation in response to such a situation by a message with a request to state a different authorization code.

Automatically generating corrected data 24 that agree with the validation criterion can be done, for instance, by comparing particular ones of the selected and read data 4 with a verification file, and filling in data from such a file in place of the original data. For this purpose, for instance an address verification application can be integrated into the handling instructions 24, or the handling instructions can be designed for consulting on-line services.

An uncommonly annoying error in the automatic generation of mailings or other presentations of data is the structural placement of data of a particular type in incorrect positions, for instance the credit and debit columns on a statement being changed around. For the early detection of such errors, the handling instructions 24 can include instructions for registering the number of documents for which the test result represents a conflict with the validation criterion and for generating a category conflict signal if that number is greater than or equal to a reference value. The instructions are preferably so arranged that the validation test and the testing of the number of conflict signals against a reference value is done before physical documents 13 are produced, or before electronic documents 9, 10 are sent.

That the validation test is carried out on the data 4 which have in actual fact been selected for placement in a document provides the advantage that the verification takes place far downstream of the document generation process. Artifacts in the data selection and data arrangement as well as omissions in checking documents can therefore be obviated by the verification.

In situations where for each document different data are selected and read for placement at different positions, a different indication of possible incorrect placement of data or incorrect specification of verification criteria is obtained by designing the handling instructions 24 for, in response to a conflict found upon testing of data for placement at one of the positions of a document, causing the respective data to be tested against another one of the validation criteria, belonging to another one of the positions, and, if the data satisfy any one of the other ones of the validation criteria belonging to another one of the positions, generating a category conflict signal.

The input 26 of instructions for verifying the data 4 can be simplified if the determination of a validation criterion for validating data in a position is carried out depending on the read data 4. To that end, it is possible, for instance, to provide an application which recognizes different kinds of frequently occurring data themselves and automatically selects the associated validation criteria. Thus, for instance, addresses (and especially post codes), telephone numbers, amounts of money, ages can be identified from series of data with a reasonable reliability. The operation of such a system can further be improved by storing properties and used validation criteria for series of documents and using them as input data in determining validation criteria. For selecting validation criteria starting from analysis of the data to be validated, use can be made, for instance, of fuzzy logics and statistical analysis techniques. Errors in the selection of validation criteria can be automatically signaled by causing category conflict signals to be generated as described above. To prevent selection of incorrect validation criteria, it may further be provided that validation criteria associated with a particular position on a particular type of document are in each case proposed to the user before they are applied.

A practical and simple manner of selecting validation criteria is obtained by testing read data selected for placement at a particular position in each of the documents against at least two potential validation criteria, comparing numbers of conflict messages obtained in testing the data against the potential validation criteria; and selecting, as validation criterion to be applied to the data, at least that one of the validation criteria for which the number of conflict signals is the least. In that case, too, it is advantageous to supplement the set of potential validation criteria with criteria formulated and applied by the user himself.

Figure 2:
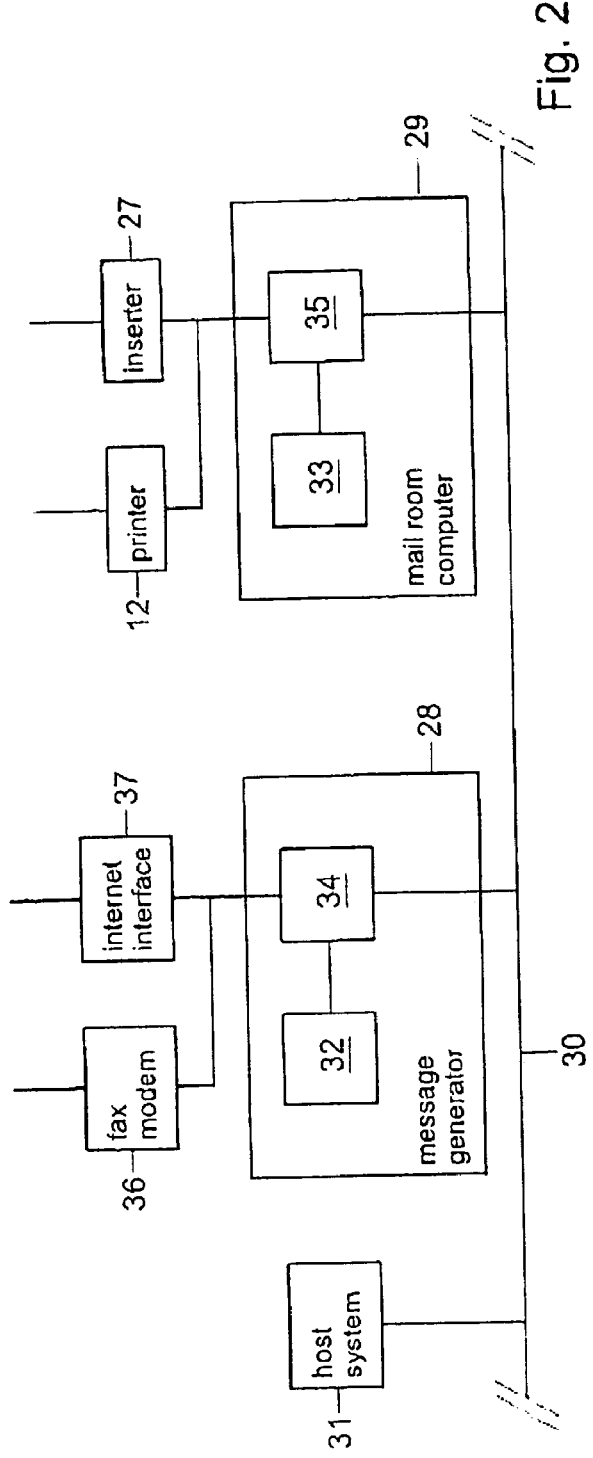
FIG. 2 is a schematic representation of a system according to the invention.

FIG. 2 represents a system for composing messages utilizing the above-described method. Of the system, the printer 12 and an inserter system 27 for composing mail items are also represented in the method mapped in FIG. 1.

The system according to this example is comprised of two computer systems 28, 29. The first computer system 28 constitutes a client connected to a network 30 to which, further, a server 31 is coupled in which the rough data 1 are stored. For this computer, the designation "message generator" is used here. The second computer system 29 is also a client which is connected to the network 30 and it is designated here as the "mailroom computer".

The memory structure of the system is formed by inter alia the memories 32, 33 of the two computer systems 28, 29. Further, these computers are provided with data processors 34, 35 which communicate with the memory provisions 32, 33. Which of the above-described data and instructions are stored in which memories is not essential to the proposed method and the proposed system and will depend on common practical considerations, such as speed and limitation of the loading of the network 30 during readout of the instructions by a data processor assembly. In general, instructions for the specification 7 of layout instructions 5 identical for documents of a particular type, the selected data 4, instructions for the formulation 6 of the selection instructions 2, the selection instructions 2, the layout instructions 5, instructions for the formulation 26 of the handling instructions 24, the handling instructions 24, the corrected data 28, the e-mail documents 9 and the fax documents 10 will be stored in the memory 32 of the message generator 28 and the print instruction files 11 and the inserter instructions 22 will be stored in the memory 33 of the mailroom computer 29. Of the operations, in general only the operations relating to the printing and processing of printed mail items will be carried out in the mailroom computer 29.

For sending out the composed document data, the system is equipped with a fax modem 36 connected with the message generator. Further, the message generator is connected with an interface 37 for connection with the internet. This connection can be established with an adapter in a manner known per se. Further send-out provisions are formed by a port of the mailroom computer 29 via which signals can be sent to the printer 12. The printer 12 sends out the document data in the form of a printing of a physical document 13.

The system further comprises finishing means for finishing the documents into messages, in the form of the inserter system 27, software stored in the memory 33 of the mailroom computer 29, for controlling the inserter system 27 and, stored in the memory 32 of the message generator 28, software for generating e-mail messages and software for generating fax messages.

The programs for generating e-mail messages and for generating fax messages at the same time form, in combination with the associated send-out equipment 36, 37 controlled thereby, sending means for sending the documents.

It is further advantageous to include, in the message data, finishing instructions for finishing the sending of the documents. The finishing instructions for an e-mail 39 can comprise, for instance: an e-mail address 19 and a specification 20 of attachments to be sent along. For a fax 40, the finishing instructions can comprise, for instance, the fax number 21 of the addressee and instructions for the time of transmission. For a mail item 41, the finishing instructions can be, for instance, the instructions 22 for controlling the inserter system 27. These can include, for instance, instructions for printing an address on an envelope, instructions concerning enclosures to be added, specifications concerning the manner of folding, and instructions concerning the choice of an envelope. The finishing instructions 22 can also include instructions for grouping and/or sorting finished mail items 41.

The determination of the finishing instructions can depend on the outcome of the validation of selected data 4 of a document. Thus, for instance, in response to a conflict between the data and a validation criterion, the document containing the data in response to which the respective conflict signal was generated, can be removed to a reject destination 25.

Determining the folding specifications can be done, for instance, by determining, starting from the layout instructions 5 and read data 4 selected for placement at a particular prescribed position, which data in placed form constitute an address field, the position in at least vertical direction (for a "portrait" document the direction of the long side and for a "landscape" document the direction of the short side) of the-address field, and, starting from the position of the address field and from at least data concerning the position of an address window of an envelope for packaging the document and a height of the envelope, determining settings of a folding machine. Further details concerning the determination of settings of a folding machine starting from the height of an envelope, the position of the address, the position of the address window of the envelope and the height of the envelope are described in European patent specification 0 498 515, which is hereby referred to.

The data on the basis of which addresses are determined which are printed on envelopes in which the documents are packaged can be determined directly on the ground of the selected data. It is important here that the printing and transport of documents and envelopes proceed in mutual synchronization. The risk of each time packaging documents in envelopes with an address belonging to a next or preceding document can be reduced by reading the addresses from the documents. To that end, however, it is desirable that it be known what the position of the address on the document is. To that end, starting from the layout instructions 5 and read data 4 selected for placement at a particular, prescribed position, which data in placed form constitute an address field, the address field position in at least vertical direction can be determined. By subsequently providing that in finishing, the address data are read in accordance with the address field position, an additional safeguard is obtained for addressing the envelopes in accordance with address data included in the document. The address data can be read from the document data 11 from an electronic representation of the image of the document or from the physical document 13. The read address data can be printed on the envelopes. If the read address data are used only for verifying the synchronization between the printings of the envelopes and the printings of documents to be packaged therein, errors due to reading errors are prevented and a less accurate reading of characters or even simpler techniques, such as the counting of signs or the comparison of lengths of names, will suffice. In case of a synchronization error, also such simple techniques which cannot detect individual incorrect characters will often give an error message directly or after comparison of a few documents and envelopes.

The address of a message can also be determined in accordance with the read data 4 and form part of the sending instructions, while in the finishing operation the message containing the generated document is addressed with the address determined for that document.

Generating the finishing instructions may further include determining postal data concerning the group of physical documents in accordance with the read data 4, and determining instructions for generating a mail manifest for the group of documents in accordance with the postal data. The mail manifest can then be printed, for instance, within the framework of the printing of documents.

What is claimed is:

1. A method for composing messages each comprising a document of a particular type, comprising:
   A) providing layout instructions identical for each of said documents,
   B) providing a first data source with machine-readable data;
   C) providing selection instructions for selecting data from a the first data source for at least one prescribed position in each of said documents;
   D) providing instructions for handling of the selected data read from the data source for the prescribed position;
   E) automatically composing document-defining document data for each of said documents, comprising:
      E1) selecting and reading data from said first data source for the prescribed position in each of said documents in accordance with the selection instructions,
      E2) forming, from said data selected and read from said first data source, a second data source of data selected for the prescribed position in each of said documents:
      E3) reading said data selected for the prescribed position from said second data source:
      E4) processing said data read from said second data source in accordance with layout instructions, into documents;
      E5) processing said data, read from said second data source for the prescribed position in accordance with said handling instructions, into message data other than said document data; and F) finishing said documents in an inserter system in accordance with instructions for controlling the inserter system included in said message data.

2. A method according to claim 1, wherein determining instructions for the inserter system comprises:
whilst starting from the layout instructions and read data selected for placement at the prescribed position, which in placed form constitute an address field, determining the position in at least vertical direction of the address field, and
whilst starting from the position of the address field and from at least data concerning the position of an address window of an envelope for packaging the document and a height of the envelope, determining settings of a folding machine.

3. A method according to claim 1, wherein step C comprises providing selection instructions for selecting data from a data source for multiple prescribed positions in each of said documents; step D comprising providing instructions for handling of the selected data read from the data source for at least one of the prescribed positions; step E1 comprising selecting and reading data from said first data source for the at least one prescribed position in each of said documents in accordance with the selection instructions, step E5 comprises processing said selected data, read from said data source for the at least one prescribed position in accordance with said handling instructions, into message data other than said document data.

4. A method according to claim 3, wherein said message data comprise finishing instructions and wherein the finishing of each of said documents is done in accordance with said finishing instructions.

5. A method according to claim 4, wherein generating the finishing instructions further comprises: whilst starting from the layout instructions and read data selected for placement at the prescribed position which in placed form constitute an address field, determining an address field position in at least vertical direction, and wherein the finishing further comprises: in accordance with said address field position, reading address data from document data, and representation of the document or the physical document.

6. A method according to claim 4, wherein generating the finishing instructions further comprises: in accordance with said read data, determining sending instructions comprising an address to which the document is to be sent, and wherein the finishing further comprises: addressing the message containing the generated document with address determined for that document.

7. A method according to claim 4, wherein said generated finishing instructions comprise: instructions for adding and sending along attachments.

8. A method according to claim 7, wherein generating the finishing instructions further comprises: in accordance with said read data, determining postal data concerning said documents and, in accordance with said postal data, determining instructions for generating a mail manifest for said documents, and wherein the finishing of said documents comprises: generating said mail manifest.

* * * * *